United States Patent [19]

Hipchen et al.

[11] 4,284,683
[45] * Aug. 18, 1981

[54] STRUCTURAL LAMINATE

[75] Inventors: Donald E. Hipchen, Seminole; Michael J. Skowronski; Joseph R. Hagan, both of Clearwater, all of Fla.

[73] Assignee: The Celotex Corporation, Tampa, Fla.

[*] Notice: The portion of the term of this patent subsequent to Oct. 3, 1995, has been disclaimed.

[21] Appl. No.: 79,771

[22] Filed: Sep. 28, 1979

Related U.S. Application Data

[60] Continuation of Ser. No. 886,110, Mar. 13, 1978, abandoned, which is a continuation of Ser. No. 745,169, Nov. 26, 1976, abandoned, which is a division of Ser. No. 650,243, Jan. 19, 1976, Pat. No. 4,028,158.

[51] Int. Cl.³ .................. B32B 5/20; B32B 5/26; B32B 5/28
[52] U.S. Cl. .................. 428/285; 428/298; 428/310; 428/313; 428/317; 428/422.8
[58] Field of Search .............. 428/310, 313, 317, 152, 428/303, 284, 285, 297, 298

[56] References Cited

U.S. PATENT DOCUMENTS

| 2,609,320 | 9/1952 | Modigliani | 427/424 |
|---|---|---|---|
| 3,172,072 | 3/1965 | Willy | 428/310 |
| 3,496,058 | 2/1970 | Schroter et al. | 428/332 |
| 3,506,533 | 4/1970 | Berner | 428/152 |
| 3,554,851 | 1/1971 | Modigliani | 428/317 |
| 3,578,544 | 5/1971 | Thorsaud | 428/317 |
| 3,617,594 | 11/1971 | Willy | 428/317 |
| 3,814,659 | 6/1974 | Nadeau | 428/313 |
| 3,867,494 | 2/1975 | Rood et al. | 428/310 |
| 3,874,980 | 4/1975 | Richards et al. | 428/313 |
| 3,903,346 | 9/1975 | De Leon et al. | 428/422.8 |
| 3,916,060 | 10/1975 | Fish et al. | 428/303 |
| 3,960,999 | 6/1976 | Massie | 428/313 |
| 4,028,158 | 6/1977 | Hipchen et al. | 428/313 |
| 4,044,184 | 8/1977 | Ashida et al. | 428/313 |
| 4,118,533 | 10/1978 | Hipchen et al. | 428/313 |
| 4,163,824 | 8/1979 | Saidla | 428/313 |
| 4,212,917 | 7/1980 | Skowronski et al. | 428/313 |

FOREIGN PATENT DOCUMENTS

| 796269 | 10/1968 | Canada. | |
| 706145 | 5/1966 | Italy. | |
| 1073932 | 6/1967 | United Kingdom. | |
| 1075496 | 7/1967 | United Kingdom. | |
| 1416283 | 12/1975 | United Kingdom | 428/313 |
| 1418753 | 12/1975 | United Kingdom | 428/313 |

OTHER PUBLICATIONS

Modigliani, "Glasurethane–A New Dimension in Reinforced Plastics", Soc. of Plastics Ind., Inc. (1970) Section 8-C pp. 1-2.
Modigliani, "Reinforced Urethane Foam", Moder Pastics Encyclopedia (1972-1973) p. 282.

Primary Examiner—William J. Van Balen
Attorney, Agent, or Firm—David R. Murphy; James W. Grace; Charles W. Vanecek

[57] ABSTRACT

A structural laminate comprises at least one planar facing sheet with a rigid foam attached to one surface of the facing sheet. The rigid foam may be any polymeric material which is capable of being foamed. Distributed substantially evenly throughout the foam is a mat of long straight glass fibers arranged in layers substantially parallel to the facing sheet. The process for producing this structural laminate comprises the steps of contacting a thin, substantially incompressible yet expansible mat of long straight glass fibers with a foam-forming mixture on each face of the mat, and passing the facing sheets having the mat and the foam-forming mixture there between through the nip of two rotating rolls.

15 Claims, 4 Drawing Figures

STRUCTURAL LAMINATE

This is a continuation of application Ser. No. 886,110, filed Mar. 13, 1978, now abandoned, which is a continuation of application Ser. No. 745,169, filed Nov. 26, 1976, now abandoned, which is a division of application Ser. No. 650,243, filed Jan. 19, 1976, now U.S. Pat. No. 4,028,158.

BACKGROUND OF THE INVENTION

1. Field of the Invention

This invention relates to laminates and foam filled sheet products both decorative and structural and more particularly it relates to structurally rigid sheets of foam having glass fibers distributed substantially evenly throughout the foam. It also relates to a method for forming such a product.

2. Description of the Prior Art

The field of foamed resins is wide and the choice of resin is determined not only by cost and availability but also properties such as flammability, friability, thermal conductance, appearance, ease in foaming and application and moisture resistance. And it is, of course, well-known to include fillers and additives to alter the properties of the foamed material.

Many attempts have been made to create structural laminates particularly of foamed resins to be used for purposes of insulation as well as for wall and ceiling panels. Laminates have often been limited in the choice of foamed resins for this reason. Alternatively, foamed resins which are unsatisfactory in respect to certain properties have been made acceptable by the use of additives. These additives or fillers have had various disadvantages such as the toxic nature of halogen and/or phosphorus containing fire retardant additives. Self-supporting foamed laminates, such as the polystyrene and polyvinyl chloride, are also well-known, but have low structural strengths which limit the use of such laminates.

Laminates employing a core of batting material are also known in the art. Typically such materials suffer discontinuities and structural weaknesses.

It is therefore an object of this invention to create a strong laminate which is free of discontinuities.

It is a further object of this invention to form a laminate utilizing a foamed polymeric resin with a mat of long straight glass fibers to form a unique laminate of superior performance and of pleasing appearance.

Before laminates of this type can be used, however, it is necessary that they meet structural and fire safety standards.

Previous attempts to make similar structures utilizing foams have relied on the spongy character of a high loft batting into which a foam-forming resin was forced and then permitted to foam and expand at the same rate as the high loft fiberous batting material expanded. An example of this process applied to making a flexible foam filled batting material can be found in U.S. Pat. No. 3,617,594.

A distinct disadvantage is presented by using a high loft batting in that the batting may elastically recover faster than the foam forming mixture expands thereby producing voids or pockets within the resultant material, the pockets contributing directly to possible structural failure of the material when subjected to high heat conditions.

It is therefore an object of this invention to form a structural laminate using a low loft mat of long straight glass fibers, the mat being thin, substantially incompressible, yet expansible under the sole influence of the expansion of a foam-forming mixture which penetrates and completely fills the interstices between the fibers of the mat.

A method of making a low loft mat which satisfies the functional and structural requirement of this invention is to be found in U.S. Pat. No. 2,609,320 provided certain limitations are placed on the method. For example, in a mat acceptable for use in a laminate according to this invention, the glass fibers are attached to one another forming interfiber bonds by an amount of fiber binder sufficient to make the mat of glass fibers dimensionably stable but insufficient to fill the interstices between the glass fibers. Preferably only a minimum amount of this fiber binder should be employed. Further the mat should not be expanded or puffed up in thickness as is taught in U.S. Pat. No. 2,609,320 but rather should be of low loft such that pressure applied to the faces of the mat will not substantially reduce the thickness of the mat and such that the mat does not elastically recover to any appreciable amount when the structure is released from the faces of the mat. Of course, any other method can be used which would result in a batt of glass fibers having a structure substantially the same as that produced by the method of U.S. Pat. No. 2,609,320 with these restrictions.

SUMMARY OF THE INVENTION

The structural laminate of the present invention has at least one but preferably has two facing sheets, one on either side of the foam core. These facing sheets can be constructed of a wide variety of non-flammable materials such as asbestos, glass fibers, or metals. In the broadest aspects of the invention, any metal can be employed such as copper, brass, iron, steel, or aluminum. Aluminum is the preferred metal because of its ductility and ease with which it can be manufactured into a material of suitable thickness.

Attached to one surface of the at least one facing sheet is a rigid foam formed from a foam-forming mixture. The foam-forming mixture is one which will result in a rigid foam.

Polyurethanes and phenolic polymers are well-known materials in laminates in that they encompass many desirable properties for use in laminates, particularly structural laminates. Other polymers that can be foamed include, rubber, polyvinyl chloride, urea-aldehydes, melamine-aldehydes, polystyrene, polypropylene, polyethylene, cellulose acetate, epoxy resin, acrylonitrile-butadiene-styrene-copolymer and silicones.

Suitable foaming resin compositions are disclosed in U.S. Pat. Nos. 2,577,277, 2,498,621, 2,572,568, 2,623,023 and 2,461,942. Other foamable resin compositions may be used.

Foaming resin compositions contain blowing agents which give gases when heated to proper temperatures such as carbon dioxide, ammonium carbonate, potassium carbonate, hydrogen peroxide and chlorinated and fluorinated hydrocarbons such as fluorotrichloromethane.

Catalysts, surfactants, dyes and other special additives may be added to the composition as is well-known in the art in order to effect certain properties. Surfactants such as polyoxyethylene-sorbitan monopolymitates, polyoxyethylene sorbitan polydimethyl siloxane and polydimethyl siloxane polyoxyalkylene block copolymers can serve as wetting agent in adhering fibers to foam and can affect the foam cell size by lowering surface tension.

The structural laminates of the present invention include a mat of long straight glass fibers. The fibers of the mat are arranged in layers which are distributed substantially evenly throughout the rigid foam, each layer being substantially parallel to the facing sheet and the rigid foam completely filling the interstices between the glass fibers of the mat. The glass fibers are generally straight and not crimped, crinkled, or the like. The glass fibers are not short but rather long, generally having a length greater than one foot and preferably 5 to 12 feet. Intermingled with the glass fibers is a relatively minor proportion of a binder, preferably a silane modified polyester binder amounting to about 2 to 10 percent by weight of the combined glass fiber and binder. The glass fiber mat having this amount of fiber binder is dimensionally stable yet is expansible under the influence of the expansion of any foam-forming mixture caused to penetrate into the interstices between the fibers of the mat.

The glass fiber mat is incorporated into the structural laminate in an amount which will insure the continued structural integrity of the laminate when it is exposed to high temperature and open flames yet not so much as to result in the deterioration of the surface of the structural laminate due to exposed single fibers. The glass fiber mat is functionally effective when included in the range of 4–24 gms/board foot of structural laminate. A structural laminate preferably comprises 6–20 gms of glass fiber mat per board foot of structural laminate.

A particularly suitable process for producing a structural laminate according to this invention comprises the steps of contacting the previously formed, thin, substantially incompressible yet expansible mat of long straight glass fibers with a foam-forming mixture as outlined above, placing a facing sheet in contact with at least one face of the mat, and passing the facing sheet, mat and foam-forming mixture between the nip of two rotating rolls thereby forcing the foam-forming mixture into the interstices between the glass fibers of the mat. The mixture having the glass fibers distributed substantially evenly therethrough is subjected to the influence of heat controllably added by the circulation of hot air between 150° F. and 250° F. and cured to a rigid foam structural laminate. This rigid structural laminate is then periodically severed into finite lengths thereby forming discrete panels.

According to another aspect of the present invention it has been discovered that stretching of the mat of glass fibers in a direction parallel to the running length of the mat by a certain amount aids in the production of a structural laminate having a more uniform distribution of the glass fibers throughout the mat. The stretching is accomplished by an amount sufficient to rupture only some of the inner fiber bonds and generally between one and ten percent based upon the length of the mat prior to stretching.

The laminates may be used for decorative panels in which case one side of the laminate is decorated or embossed. However, both facing sheets may be decorated.

DESCRIPTION OF THE PREFERRED EMBODIMENTS

Figure 1:
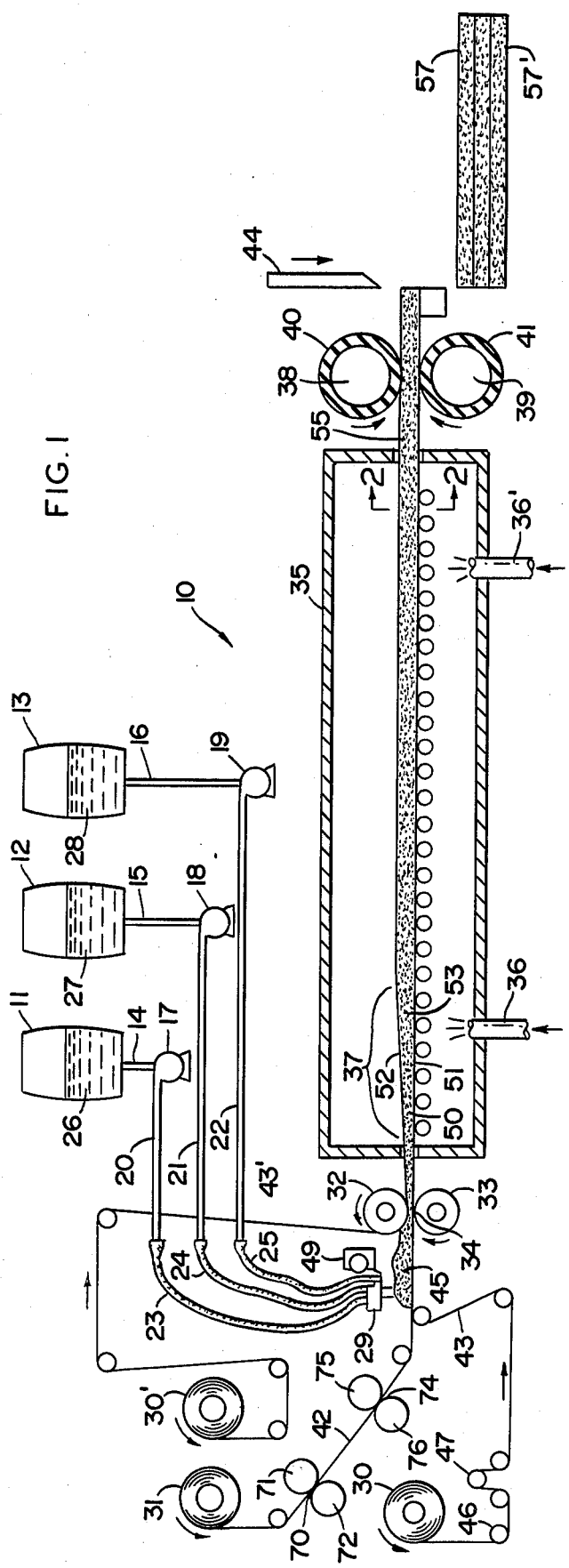
FIG. 1 is schematic representation of an apparatus suitable for practicing the process of the present invention.

In FIG. 1 there is shown schematically an apparatus 10 suitable for use in connection with the present invention. The apparatus 10 comprises tanks 11, 12 and 13 for containing the foaming ingredients and additives such as blowing agents, surfactant, etc., each respectively connected to outlet lines 14, 15 and 16. The lines 14, 15 and 16 form the inlet to metering pumps 17, 18 and 19. The pumps 17, 18, and 19 discharge respectively through lines 20, 21 and 22 which are in turn respectively connected to flexible lines 23, 24 and 25. The flexible lines 23, 24, and 25 discharge to mixing head 29. The apparatus 10 is also provided with a roll 30 of lower facing sheet material 43, a roll 30' of upper facing sheet material 43', and a roll 31 of glass fiber mat material. The apparatus 10 is also provided with metering rolls 32 and 33 and an oven 35 provided with vents 36 and 36' for introducing and circulating hot air. The apparatus 10 is also provided with pull rolls 38 and 39 each of which preferably has a flexible outer sheath 40 and 41. The apparatus 10 is also provided with cutting means 44 for severing the structural laminate produced by this process into finite lengths thereby producing discrete panels.

In operation the tanks are charged with the foam forming mixture in whatever manner is convenient and preferred for the specific polymer. For instance, for a urethane foam, the polyol can be in one tank, the polyisocyanate in another and catalyst in a third. Other polymers such as polyvinyl chloride can be used as a dispersion in plasticizers and a blowing agent introduced. Or polyvinyl chloride can be extruded as can polystyrene, cellulose acetate and the polyolefins among others. Rubber and urea-formaldehyde can be frothed and admixed with the appropriate blowing agent and surfactant. The speeds of the pumps 17, 18 and 19 are adjusted to give the desired ratios of the ingredients in the tanks 11, 12 and 13. These ingredients pass respectively through line 20, 21 and 22 as well as lines 23, 24 and 25 whereupon they are mixed in the mixing head 29 to form the foam-forming mixture 45 which contacts the thin, substantially incompressible yet expansible mat of glass fibers 42 fed from the roll of glass fiber mat 31 toward the nip 34 between the two rotating metering rolls 32 and 33.

By virtue of rotation of the pull rolls 38 and 39, the lower facing sheet 43 is pulled from the roll 30, the upper facing sheet 43' is pulled from the roll 30', and the glass fiber mat 42 is pulled from the roll 31. The facing sheets 43 and 43' having the mat 42 and foam-forming mixture 45 there between pass through the nip 34 of the two rotating metering rolls 32 and 33. The mixing head 29 is caused to move back and forth, normal to the plane of the paper by virtue of a reciprocating means 49. In this manner, an even amount of foam-forming mixture 45 can be maintainced upstream from the nip 34 and in contact with the mat 42 of glass fibers. The mat 42 of glass fibers being substantially incompressible yet expansible has such a low loft that the pressure applied to the mat 42 by the rotating rolls 32 and 33 does not substantially reduce the thickness of the mat 42 but rather the foam-forming mixture 45 is caused to penetrate and completely fill the interstices between the glass fibers forming the mat 42. Further the mat 42 is of such a low loft that after passing through the nip 34 the glass fibers do not themselves elastically recover but expand under the sole influence of the expansion of the foam-forming mixture 45. The velocity of the mat 42 as it passes between the nip 34 of the two rolls 32 and 33 substantially equals the velocity of the facing sheets 43 and 43'. After passing between the nip 34 of the two rolls 32 and 33, the composite structure 48 now comprises a lower and upper facing sheet 43 and 43' having therebetween a glass fiber mat 42 completely permeated by the foam-forming mixture 45 which wets the glass fibers of the mat 42.

This composite structure 48 now passes into oven 35 and while in the oven 35 the foam-forming mixture expands in an expansion zone 37. This expansion is initiated by heat generated in an exothermic reaction between the components of the foam-forming mixture 45 and is regulated by heat added to the oven 35 by the hot air from vent 36. The temperature within the oven 35 is controlled by varying the temperature of the hot air from vent 36 and 36' in order to insure that the oven temperature is maintained within the desired limits necessary to cure the foam employed. While in the expansion zone 37 the layers of fibers 50 of the glass fiber mat separate under the influence of the expanding foam 53 in such a manner as to be evenly distributed throughout the foam 53 in planes substantially parallel to the plane of the facing sheets 51 and 52.

The foam 53, under continuing influence of the heat added to the oven 35 by the controlled introduction of hot air from vent 36 and 36', cures to form the structural laminate 55 of this invention. The structural laminate 55 then leaves the oven 35, passes between the pull rolls 38 and 39, and is cut by cutting means 44 into finite lengths thereby forming discrete panels 57 and 57' of the structural laminate 55.

Figure 4:
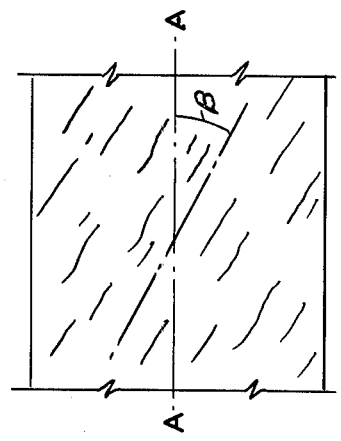
FIG. 4 is plan view of the structural laminate of FIG. 2 taken along the line 4—4 of FIG. 2.
Figure 2:
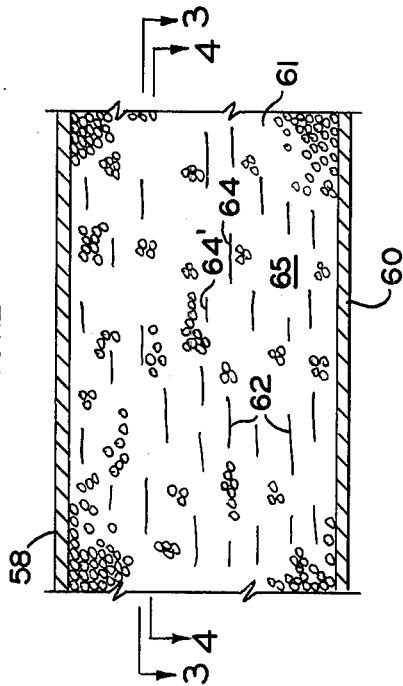
FIG. 2 is an enlarged sectional view of a structural laminate taken along line 2—2 of FIG. 1.
Figure 3:
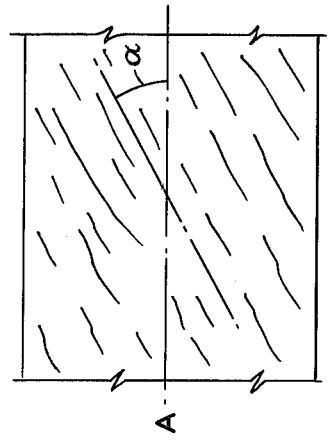
FIG. 3 is plan view of the structural laminate of FIG. 2 taken along the line 3—3 of FIG. 2.

In FIG. 2 there is shown an enlarged sectional view of a structural laminate 55 of the present invention taken along line 2—2 of FIG. 1. The structural laminates 55 shown in FIG. 2 comprises two facing sheets 58 and 60. It will be appreciated by persons of ordinary skill in the art that a structural laminate of this type can be made in such a manner as to only have a single facing sheet, or one of the facing sheets 58 or 60 can be removed from the structural laminate without seriously degrading the desired functional performance. The structural laminate 55 shown in FIG. 2 further comprises a rigid foam 61 formed from the foam-forming mixture 45 of FIG. 1. Distributed substantially evenly throughout the foam 61 is a multitude of long straight glass fibers 62 arranged in layers 64, 64' which are substantially parallel to the facing sheets 58 and 60. The rigid foam 61 completely fills the interstices 65 between the glass fibers 62. The glass fibers in each layer 64, 64' are at an acute angle to the glass fibers in each next adjacent layer. This is shown schematically by examining two adjacent sections, the first along line 3—3 and shown in FIG. 3 and the second along line 4—4 shown in FIG. 4. In the two FIGS. 3 and 4, a plan view of the structural laminate of FIG. 2 is shown with refernece lines A—A representing the same direction in the two figures. In FIG. 3 the glass fibers 62 are shown to be running predominantly at an angle α to the reference line A—A while in FIG. 4 the glass fibers 62 are shown to be running predominantly at an angle β with respect to reference line A—A. The fibers in these two adjacent layers represented by the sections shown in FIGS. 3 and 4 are aligned such that the fibers in one layer are at an angle of α plus β with respect to the fibers in the next adjacent layer. The angle α plus β is generally an acute angle and is typically less than 60° in a structural laminate produced according to this invention. While the glass fibers 62 are generally long and straight, that is not crimped or twisted, the fibers 62 become slightly undulated within the plane layers 64, 64' which are substantially parallel to the facing sheet or sheets 58, 60 of the structural laminate 55. The slight non-contiguous undulations are induced in the fibers 62 as the foam-forming mixture 45 expands and disperses the fibers 62 throughout the laminate 55. The overall thickness "d" of a laminate 55 produced according to this invention is typically from 0.4 to 2.0 inches while the initial thickness of the glass fiber mat 42 is less than 0.1 inches and more typically 0.010 to 0.050 inches. The initial thickness of the glass fiber mat 42 is generally less than 1 and ½ times the separation of the facing sheets at the nip 34 of the two rotating rolls 32 and 33, the low loft of the mat 42 preventing any substantial compression by the two rolls 32 and 33.

The preferred apparatus by which stretching of the fiber mat is accomplished is shown in FIG. 1. As shown in FIG. 1 the mat 42 passes first between the nip 70 of a first pair of rolls 71, 72 and then through the nip 74 of a second pair of rolls 75, 76 the axes of the rolls 71, 72, 75, 76 are perpendicular to the running length of the mat 42. The nips 70, 74 of each pair of rolls 71, 72 and 75, 76 engage the mat 42. The peripheral speed of the second pair of rolls; namely, rolls 75, 76 is greater than the peripheral speed of the first pair of rolls; namely, the rolls 71, 72. The difference in peripheral speed is adjusted such that stretching of the mat 42 is accomplished in the running or machine direction. This direction is parallel to the running length of the mat 42. An alternative to the arrangement of the two pairs of rolls is to provide the roll 31 with a brake which slows the advance of the mat 42 from the roll 31 as the mat 42 is pulled by the rolls 32, 33.

EXAMPLE 1

A structural laminate was produced according to this invention by contacting a mat of glass fibers with a foam-forming mixture. The mat of glass fibers was substantially incompressible and had an overall thickness of 0.030 inches. The glass fibers forming the mat were long, straight fibers having an average diameter of less than 25 microns and lengths varying from 5 to 12 feet with an average length of over 5 feet. The ingredients of the foam-forming mixture were arranged in three tanks as follows: In tank 11:

| | |
|---|---|
| polymethylenepolyphenyl isocyanate sold under the trademark "PARI-20" from Upjohn Chemical Company | 100 parts |
| fluorotrichloromethane | 18.8 parts |
| polydimethylsiloxane polyoxyalkylene copolymers sold as L-5340 available from Union Carbide | 2.16 parts |

In tank 12:

| | | |
|---|---|---|
| diethylene glycol | 8.3 parts | |
| In tank 13: | | |
| 2, 4, 6-tris (dimethylaminomethyl) phenol sold as DMP-30 from Rohn & Haas Company | 0.84 part | |
| potassium-2-ethyl-hexoate | 1.75 parts | |
| polyoxyethylene glycol (m.w. 200) sold as Carbowax 200 from Union Carbide Company | 7.41 parts | |

The pull rolls are then started as are the pumps which deliver the contents of the tanks 11, 12 and 13 to the mixing head 29 in a weight ratio of 100:6.87:3.04. This corresponds to an equivalent ratio of isocyanate to diethylene glycol of 4.6:1. The contents of tank 11 are maintained at 65° F., whereas the contents of tanks 12 and 13 are at 65°–75° F. The foam-forming mixture completely fills the interstices between the individual fibers of the glass fiber mat wetting the individual fibers of the glass fiber mat. Two facing sheets of aluminum foil, each having a thickness of about 0.0015 inches are positioned one on each side of the glass fiber mat and foam-forming mixture, one of the facing sheets having an embossed decorative surface design. The facing sheets having the mat and foam-forming mixture therebetween then pass through the nip 34 of the two rotating rolls into oven 35 maintained at a temperature of 225° F. where the foam-forming mixture expands in the expansion zone 37 to a substantially uniform thickness of one inch, the glass fiber mat being included at the rate of 9.5 grams of glass fiber per board foot of laminate produced.

EXAMPLE 2

The following describes the synthesis of an alkylol group containing phenolic polymer composition.

| | | Quantity | |
|---|---|---|---|
| Item | Name | grams | gram-moles |
| A | ortho-cresol | 389 | 3.6 |
| B | HCHO (93.6% paraformaldehyde) | 144 | 4.5 |
| C | NaOH (50% solution) | 7.2 | 0.09 |
| D | HCHO | 121 | 3.8 |
| E | phenol | 338 | 3.6 |
| F | acetic acid | 6 | 0.1 |

Items A, B, and C are reacted at 90° C. for 4.75 hours in Step I to form a mixture. In Step II, items D and E are added to the mixture of Step I and the temperature is maintained at 90° C. for 2 hours. Then Item F is added to neutralize to a pH of 5.0 to 7.0 and the reaction products are cooled to room temperature.

EXAMPLE 3

This phenolic polymer is used to synthesize a cellular material.

The following quantities of the following ingredients are combined as indicated:

| Item | Ingredients Name | Quantity grams |
|---|---|---|
| A | phenolic polymer | 80 |
| B | phenol | 11 |
| C | Catalyst | |
| | p-toluene sulfonic acid 4.3 | |
| | xylene sulfonic acid 4.3 | |
| | water 4.3 | 13 |
| D | CFCl$_3$ | 10 |

| Item | Ingredients Name | Quantity grams |
|---|---|---|
| E | polydimethyl siloxane polyalkylene oxide block copolymer | 2 |
| F | water | 9 |

Items A through F are mixed in an open vessel whereupon a reaction ensues. Items A, D and F are added together in the form of (100 g) of the phenolic composition of Example 1.

The phenolic composition is distributed to the three tanks. Tank 11 is charged with the phenolic composition admixed with blowing agent, tank 12 with phenolic composition and surfactant and tank 13 is charged with the catalyst.

The foam-forming mixture completely fills the interstices between the individual fibers of the glass fiber mat wetting the individual fibers of the glass fiber mat. Two facing sheets of aluminum foil, each having a thickness of about 0.0015 inches are positioned one on each side of the glass fiber mat and foam-forming mixture, one of the facing sheets having an embossed decorative surface design. The facing sheets having the mat and foam-forming mixture therebetween then pass through the nip 34 of the two rotating rolls into oven 35 maintained at a temperature of 225° F. where the foam-forming mixture expands in the expansion zone 37 to a substantially uniform thickness of one inch, the glass fiber mat being included at the rate of 9.5 grams of glass fiber per board foot of laminate produced.

Although the invention has been described in considerable detail with reference to certain preference embodiments thereof, it will be understood that variations and modifications can be effected within the spirit and scope of the invention as described above and as defined in the following claims.

What is claimed is:

1. A structural laminate comprising:
   A. at least one planar facing sheet;
   B. a rigid foam attached to one surface of the facing sheet, the rigid foam formed from a foam-forming mixture; and
   C. glass fibers wherein:
      I. the glass fibers are distributed substantially evenly throughout the rigid foam,
      II. the glass fibers are straight,
      III. the glass fibers are greater than one foot in length,
      IV. the glass fibers are arranged in layers,
      V. each layer of glass fibers is substantially parallel to the facing sheet, and
      VI. the rigid foam completely fills the interstices between the glass fibers, the glass fibers being held in fixed relationship with respect to each other solely by the rigid foam.

2. The structural laminate of claim 1 wherein there are two parallel facing sheets, one on each face of the rigid foam.

3. The structural laminate of claim 1 wherein the facing sheet is a metal foil between 0.010 and 0.001 inches thick.

4. The structural laminate of claim 1 wherein the surface of the facing sheet obverse to that attached to the rigid foam is decoratively embossed.

5. The structural laminate of claim 1 wherein the glass fibers within each layer are substantially parallel to each other.

6. The structural laminate of claim 1 wherein the glass fibers in each layer are at an acute angle to the glass fibers in each next adjacent layer.

7. A structural laminate comprising:
  A. two planar facing sheets;
  B. a rigid foam attached between the facing sheets, the rigid foam formed from a foam-forming mixture; and
  C. glass fibers wherein:
    I. the glass fibers are distributed substantially evenly throughout the rigid foam,
    II. the glass fibers are non-crimped,
    III. the glass fibers are greater than one foot in length,
    IV. the glass fibers are arranged in layers,
    V. each layer of glass fibers is substantially parallel to the facing sheet,
    VI. the glass fibers within each layer are substantially parallel,
    VII. the glass fibers in each layer are at an acute angle to the glass fibers in each next adjacent layer, and
    VIII. the rigid foam completely fills the interstices between the fibers, the fibers being held in fixed relationship with respect to each other solely by the rigid foam.

8. The structural laminate of claim 7 wherein each facing sheet is a metal foil between 0.010 and 0.001 inches thick.

9. The structural laminate of claim 7 wherein the surface of one facing sheet obverse to that attached to the rigid foam is decoratively embossed.

10. The structural laminate of claim 7 wherein the glass fibers have an average length of from five to twelve feet.

11. The structural laminate of claim 7 wherein the glass fibers in each layer are at an angle of less than 60° to the glass fibers in each next adjacent layer.

12. The structural laminate of claim 7 wherein the glass fibers are included in an amount of 4-24 grams per board foot of structural laminate.

13. The structural laminate of claim 7 wherein the glass fibers in each layer are arranged in non-contiguous undulations in a plane parallel to the facing sheets.

14. The structural laminate of claim 1 wherein the glass fibers have an average length of from five to twelve feet.

15. A structural laminate comprising:
  A. two planar facing sheets;
  B. a rigid foam attached between the facing sheets, the rigid foam formed from a foam-forming mixture; and
  C. glass fibers wherein:
    I. the glass fibers are distributed substantially evenly throughout the rigid foam,
    II. the glass fibers are non-crimped,
    III. the glass fibers have an average length which is from five to twleve feet,
    IV. the glass fibers are arranged in layers,
    V. each layer of glass fibers is substantially parallel to the facing sheet,
    VI. the glass fibers within each layer are substantially parallel;
    VII. the glass fibers in each layer are at an angle of less than 60° to the glass fibers in each next adjacent layer, and
    VIII. the rigid foam completely fills the interstices between the fibers, the fibers being held in fixed relationship with respect to each other solely by the rigid foam.

* * * * *